United States Patent [19]
Manlick et al.

[11] Patent Number: 5,282,211
[45] Date of Patent: Jan. 25, 1994

[54] SLIP DETECTION DURING BIT-ERROR-RATE MEASUREMENT

[75] Inventors: Robert M. Manlick, Maynard; Matthew L. Fichtenbaum, Chelmsford, both of Mass.

[73] Assignee: GenRad, Inc., Concord, Mass.

[21] Appl. No.: 776,850

[22] Filed: Oct. 15, 1991

Related U.S. Application Data

[63] Continuation-in-part of Ser. No. 744,941, Aug. 14, 1991, abandoned.

[51] Int. Cl.$^5$ .............................................. G06F 11/00
[52] U.S. Cl. ..................................... 371/5.4; 371/47.1
[58] Field of Search .................. 371/5.4, 5.1, 47.1, 371/42, 46, 24, 25.1, 27, 41

[56] References Cited

U.S. PATENT DOCUMENTS

| | | | |
|---|---|---|---|
| 3,596,245 | 7/1971 | Finnie et al. | 340/146.1 |
| 3,914,740 | 10/1975 | Han | 340/146.1 |
| 4,747,105 | 5/1988 | Wilson et al. | 371/47 |
| 4,849,995 | 7/1989 | Takeo et al. | 375/116 |
| 5,146,462 | 9/1992 | Cucchi | 371/47.1 |
| 5,163,070 | 11/1992 | Bielby et al. | 375/115 |

*Primary Examiner*—Robert W. Beausoliel, Jr.
*Assistant Examiner*—N. Wright
*Attorney, Agent, or Firm*—Cesari and McKenna

[57] ABSTRACT

A bit-error-rate detector (20) in a test set (10) for a frame-based communications channel employs a pseudo-random-number generator (46) at the channel's output end that generates a sequence the same as that produced by a pseudo-random-number generator (16) at the input end, but typically with a timing offset. A chain of delay circuits (38, 40, 42, and 44) receives the channel output. Each delay circuit imposes a delay equal to a single frame time and produces a respective output. One such output (CENTER) is normally compared in an XOR gate (52) with the output of the output-end pseudo-random-number generator (46). The XOR gate (52) applies signals indicative of any symbol mismatches to a shift register (88), which forwards them, after a delay, to a bit-error-rate counter (90). At the same time, another XOR GATE (70) compares the output of the channel or of one of the other delay circuits (38, 42, and 44) with the pseudo-random-number-generator output, and a decoder (80) generates a slip-indicating output when a counter (76), which counts the number of consecutive matches that the latter XOR GATE (70) detects, indicates that the output of the channel or other delay circuit (38, 42, or 44) has matched the output-side pseudo-random-number-generator output a number of times in a row indicative of the likelihood of a frame slip. In response, a slip counter (92) is incremented and the shift register (88) cleared to avoid counting as ordinary bit errors mismatches that occurred in the CENTER signal during the matching sequence in the other signal.

6 Claims, 5 Drawing Sheets

|  | A | B | C | D | E | F | G | H |
|---|---|---|---|---|---|---|---|---|
| SYNC | 0 | 0 | 0 | 0 | 0 | 0 | 1 | 0 |
| VERIFY | 0 | 0 | 0 | 1 | 0 | 0 | 0 | 0 |
| LOAD | 0 | 0 | 1 | 0 | 0 | 0 | 0 | 0 |
| CLRCNTR | 1 | 1 | 0 | 1 | 0 | 1 | 1 | 1 |
| LOCK | 0 | 0 | 0 | 0 | 0 | 1 | 0 | 0 |
| INCSLIPCNT | 0 | 0 | 0 | 0 | 0 | 0 | 0 | 1 |

SLIP DETECTION DURING BIT-ERROR-RATE MEASUREMENT

This is a continuation in part of U.S. patent application Ser. No. 744,941, which was filed on Aug. 14, 1991, now abandoned by Robert M. Manlick and Matthew L. Fichtenbaum for Slip Detection During Bit-Error-Rate Measurement.

BACKGROUND OF THE INVENTION

The present invention is directed to communications-channel testing and in particular to detection of frame slips in frame-based channels.

An important figure of merit for a communications channel is the rate at which symbol errors occur in the signals that it conducts. Since the overwhelming majority of digital channels encode the information in choices between two voltage, frequency, or phase values, this figure of merit is known as the bit-error rate, which phrase we will accordingly use (not entirely precisely) in referring to the equivalent figure of merit for both binary- and non-binary-symbol channels.

In principle, bit-error rates are measured by simply applying a known symbol sequence as the channel input and then counting the number of symbols in the resultant channel output that do not match (a suitably delayed version of) the known transmitted sequence. The ratio of the number of incorrect symbols to the total number of received symbols is the bit-error rate.

Although measurement of bit-error rates is simple in principle, a straightforward application of the method just described can yield misleading results for some of the more-sophisticated, frame-based channels. Such channels use framing to keep track of what various parts of a received signal are intended to mean. In a multiplexed channel, for instance, one part of the signal may be data for one destination, another part may be data for another destination, and yet another part may be error-correction, diagnostic, or other housekeeping information to be used by the channel equipment itself.

To insure that information intended for one destination is not forwarded to a different destination or interpreted as housekeeping information, the channel equipment divides the channel signal into frames. Corresponding parts of all frames have the same purposes, and the channel equipment inserts into the frames unique patterns that establish the frame boundaries. If, in treating a given slice of the signal as a frame, channel equipment receiving the signal does not observe the known frame-establishing pattern in the predetermined locations, it "knows" that the slice is not really a frame and that its proposed frame boundaries should be slid along the signal until they define a slice in which the frame-indicating pattern is properly positioned.

Channel transmitters or repeaters must therefore transmit information in complete frames. However, transmitters and receivers in different channel links often employ separate clocks. The clocks are usually quite stable and accurate, but their frequencies nonetheless differ slightly in most systems. Data accordingly sometimes "pile up" or "run out" in a receiver's input buffer, and the receiver handles such situations by either slipping or repeating a frame in the signals that it forwards. This "slippage" is acceptable in normal operation of, say, voice channels, but it presents a problem in bit-error-rate measurement because a test system can report a large number of apparent errors if the timing of the expected pattern with which the test equipment compares the channel output is not adjusted for the frame "slip." The result is that the bit-error rate is greatly overstated.

Among the approaches that have been proposed for dealing with this problem is to count as only a single bit error bursts of errors that occur within a short interval. Such bursts are characteristic of frame slips; bit errors that result from frame slips ordinarily occur at a much greater rate than ordinary noise-based errors. However, frame slips are not the only causes of burst errors, so this approach provides only a rough compensation for the slip-error problem.

A more-direct approach, one that is based on explicit recognition of the frame size, is one in which successive segments of a predetermined test sequence are inserted at a given location in each successive transmitted frame. The segment of each frame into which the test segment has been inserted is monitored, and, since the inserted test sequence is known, a slip can be detected if a test-sequence segment is repeated or skipped. Such an approach is fairly effective at detecting slips, but it does not inherently provide a ready way to compensate for apparent bit errors that are counted before the slip is detected.

Another approach takes advantage of the properties of the shift-register-type pseudo-random-number generator that it employs to produce test input for the channel to be tested. Such pseudo-random-number generators apply as feedback to the first stage of a shift register the comparison of two selected subsequent stages, and the output of the last shift-register stage is the pseudo-random number. A generator at the receiving end identical to that at the transmitting end generates the expected sequence, and the test system ordinarily concludes that an error has occurred if a bit in the received signal differs from corresponding bits in the output of the receiver-side pseudo-random-number generator.

Without more, a slip could cause such a system to produce error indications. But that system's receiver has another shift register, whose first-stage input is the receiver signal. If the local pseudo-random-number generator does not successfully predict the received sequence but the comparison of the other shift register's selected stages does, the system recognizes that a slip has occurred. It thereby loads the second-shift-register contents into the local pseudo-random-number generator, and the expected-sequence signal is thereby resynchronized with the test-sequence signal. Such an approach limits the number of erroneous errors recorded, but it does not eliminate them.

SUMMARY OF THE INVENTION

The present invention provides a way to react rapidly to the occurrence of a slip and lends itself to simple and effective adjustment of the bit-error count. In accordance with the invention, different timing offsets are used simultaneously for comparisons between the test sequence and the received sequence. For instance, the same test-sequence signal may be compared with differently delayed versions of the received sequence that are offset from each other by integral numbers of frame times. One of the delayed versions of the received signal is considered the main version, whose comparison with the test sequence is ordinarily used to detect bit errors.

If this main version has the proper timing offset, its symbols will be compared with those whose application to the channel's transmitting end caused them; i.e., it will be in synchronism with the test sequence at the output end. If the test sequence is of one of the types ordinarily employed for such purposes, mismatches should occur quite frequently between the test sequence and the differently offset, auxiliary versions of the channel output. If a fairly long stretch of matches with one of the auxiliary versions occurs, therefore, it can be concluded that the auxiliary version is in synchronism and the principal version is not, i.e., that a slip has occurred.

This approach permits the slip to be detected rapidly. Additionally, it lends itself to ready compensation for the slip-caused symbol "errors": all of the "errors" in the main version that are detected during the sequence of matches with an auxiliary version can be ignored. Yet, because synchronism is known to exist between the local test-sequence generator and the auxiliary version, monitoring for symbol errors can continue during the resynchronization process, as the description below will explain.

BRIEF DESCRIPTION OF THE DRAWINGS

These and further features and advantages of the present invention are described below in connection with the accompanying drawings, in which.

DETAILED DESCRIPTION OF ILLUSTRATIVE EMBODIMENTS

Figure 1:
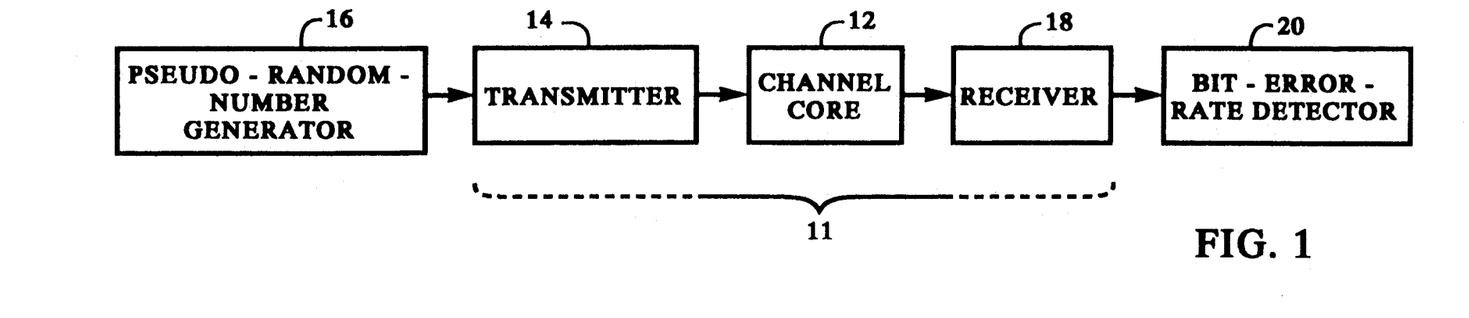
FIG. 1 is a block diagram of a test set for measuring bit-error rates in a frame-based communications channel.

FIG. 1 depicts a test set for performing bit-error-rate testing on a communications channel that operates in data frames. The channel includes at least a core portion 12 of the type that handles data in frames of consecutive data bits; that is, it carries various frame-defining signals from which frame boundaries can be determined, and it typically performs various collective operations on the contents of a frame, such as generating error-detection or -correction codes and adding signaling information. The device to be tested may include a transmitter 14 for assembling and/or encoding raw data from a test-sequence generator, such as a pseudo-random-number generator (PNG) 16, into the channel format and applying it to the channel core as its input.

The other end the channel may include a receiver 18 for disassembling and/or decoding the channel signals into the data that they represent. If the channel under test omits the transmitter 14 or receiver 18, the test set will include it. In any event, the test set includes a bit-error-rate detector 20, which compares the received data with the transmitted data.

In accordance with the broader aspects of the invention, the bit-error-rate detector 20 could "know" what data that the PNG 16 is transmitting by directly receiving those data in addition to the output of the receiver 18. In the illustrated embodiment, however, the bit-error-rate detector 20 employs its own PNG, which generates a cyclic sequence the same as that of the input PNG, although it ordinarily operates with a timing offset, in a manner that will be described below, to accommodate various channel and test-set delays.

Figure 2:
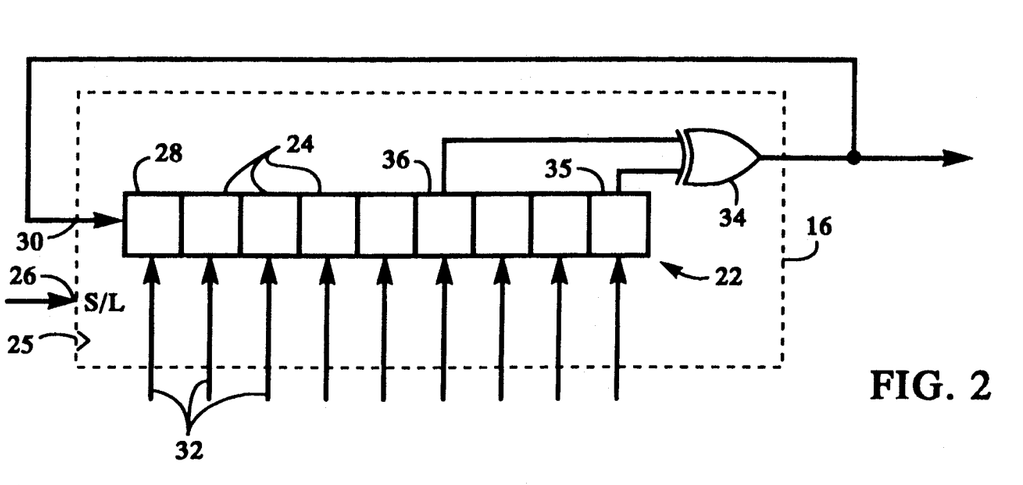
FIG. 2 is a block diagram of a pseudo-random-number generator employed in that test set.

FIG. 2 depicts an exemplary PNG of a type that can be employed in practicing the present invention. PNG 16 includes a shift register 22 operable in the normal manner, in which the contents of a number of stages 24 advance one stage to the right for each pulse that occurs at a clock input terminal 25 if the input at an S/L (shift-/load) terminal 26 has assumed the shift-specifying level, which also causes the contents of the first stage 28 to assume the value that the signal present at the serial input terminal 30 represents at the time of the clock pulse. If the S/L-terminal input has assumed the load-specifying level, on the other hand, the stages 24 receive as their inputs the values present on parallel input terminals 32. For operation as a pseudo-random-number generator, circuit 16 also includes an XOR gate 34, which applies to the serial input terminal 30 the result of comparing the output of the last stage 35 with that of, say, the sixth stage 36. The resultant PNG output is a sequence that repeats every $2^N$-1 clock pulses, where N is the number of shift-register stages.

Loading the PNG with different starting patterns by way of the parallel input terminals 32 starts the sequence at different points but does not change the sequence itself. Moreover, since the shift-register contents completely define the PNG state, no single N-bit subsequence can occur at more than one place in the sequence. Like many bit-error-rate detectors, the illustrated embodiment takes advantage of these features to synchronize a similar PNG at the receiving end with the corresponding PNG at the transmitting end, as will become evident as the description proceeds.

Figure 3A:
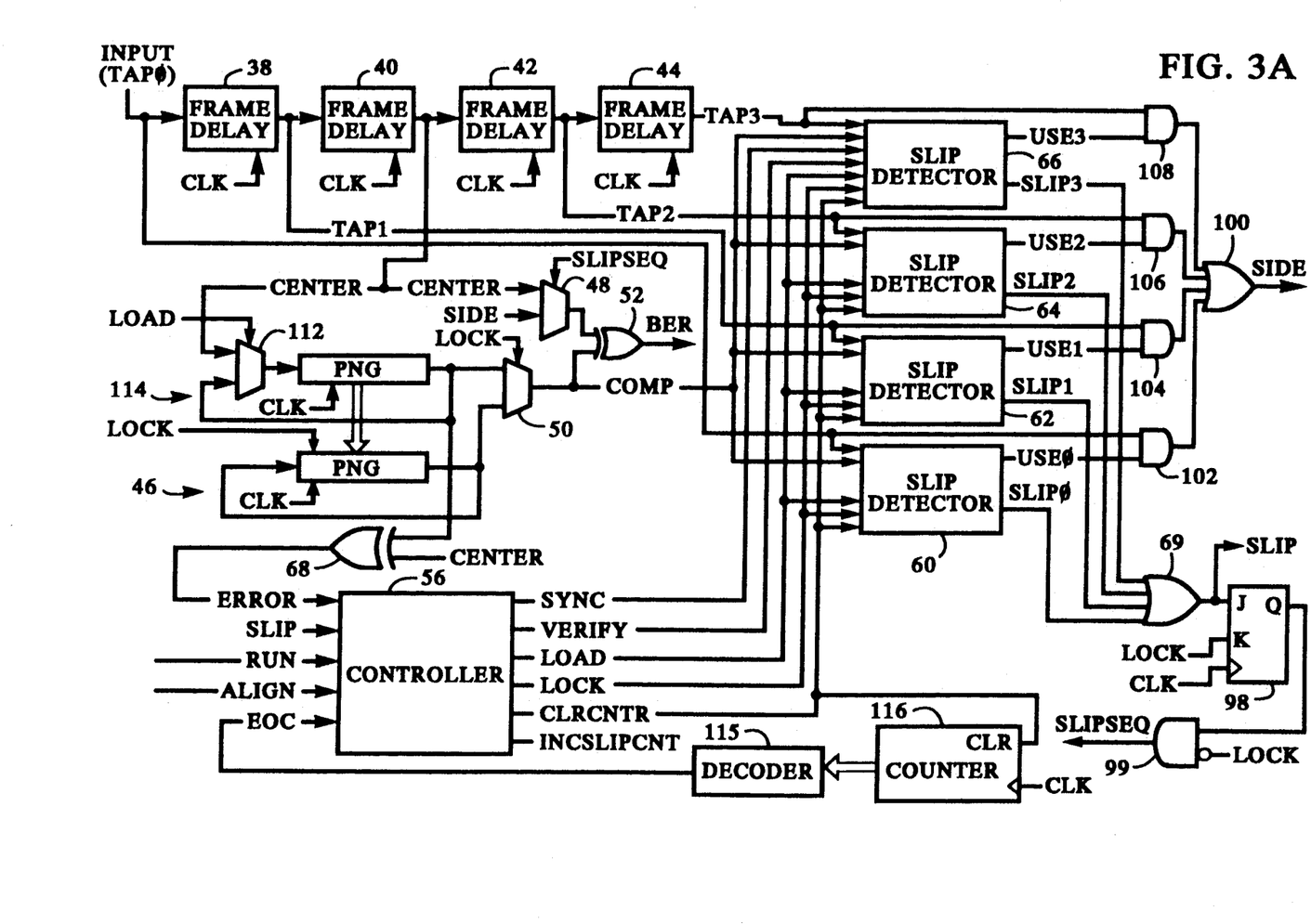
FIGS. 3A and 3B together form a logic diagram of the bit-error-rate detector shown in FIG. 1.

In the part of the circuitry of the bit-error-rate detector 20 of FIG. 1 shown in FIG. 3A, a chain of delay circuits 38, 40, 42, and 44 receives the bit-error-rate detector input, and each delay circuit delays its respective input by the time required to transmit a single frame. For reasons that will be explained below, the circuitry of FIG. 3A compares the input delayed by two frames—that is, it compares the output CENTER of delay circuit 40—with the output of a main local PNG 46, which is identical to PNG 16. Specifically, multiplexers 48 and 50 ordinarily forward CENTER and the main-PNG output to an XOR gate 52, which thereby compares them. A controller 56 to be described below controls the states of the multiplexers 48 and 50.

In a manner to be described below, the timing of test sequences produced by PNG 46 is synchronized with the channel output sequence as represented by CENTER; i.e., the timing of PNGs 16 and 46 is so offset that the point in the local-PNG sequence with which XOR gate 52 compares a given CENTER symbol is the same as the point in the transmitting-PNG sequence to which the given CENTER symbol is the channel response. The XOR gate 52 can thus detect bit errors in the channel under test: the output BER of XOR gate 52 is deasserted so long as the current symbols in the received and locally generated bit patterns match, but BER is asserted when the two sources differ, i.e., when a bit error has occurred.

It is desirable for testing and diagnostic purposes to distinguish (1) errors caused directly by, say, noise in the channel from (2) errors that result from any resultant loss of proper test-set synchronization caused by "slippage," i.e., by the omission or repetition of one or more frames. To this end, the present invention takes advantage of the fact that slippage in frame-based channels occurs only by whole frames.

Specifically, a test set that employs the teachings of the present invention compares the locally generated sequence not only with a main version of the input (CENTER in this case) but also with versions advanced or delayed from the main version by one or more frames. As was just described, the test set normally indicates an error when it observes a mismatch with the main version. However, if errors are detected in the main version but the locally generated test sequence accurately predicts a long sequence of the symbols in one of auxiliary versions, then the test set can conclude rather reliably that the observed "errors" in the main version resulted from slippage. The test set can thus report a slip, and it can additionally ignore the mismatches that the main comparison detected during the sequence of matches that an auxiliary comparison detected in a delayed or advanced version.

The test set employs slip detectors 60, 62, 64, and 66 of FIG. 3A for the auxiliary comparisons. As FIG. 3A shows, slip detector 60 receives the undelayed input TAP0, i.e., the receiver-18 output, and slip detectors 62, 64, and 66 respectively receive outputs TAP1, TAP2, and TAP3 of delay circuits 38, 42, and 44. Each slip detector compares its respective TAPn with the multiplexer-50 output COMP, i.e., with the local-PNG output with which XOR gate 52 normally compares the CENTER signal to determine whether a bit error has occurred. In a manner that will now be described, each slip detector then uses this comparison for slip detection under the direction of the controller 56.

FIG. 3 shows that the controller 56 receives five inputs, namely, ERROR, SLIP, RUN, ALIGN, and EOC. A higher-level controller, not shown in the drawings, generates the RUN and ALIGN signals for purposes to be explained directly. The purpose of EOC will also be explained in due course. An XOR gate 68 generates the ERROR signal in response to any difference between the local-PNG output and CENTER, and an OR gate 69 generates the SLIP signal when any of the slip detectors 60, 62, 64, and 66 detects a slip.

Figure 4:
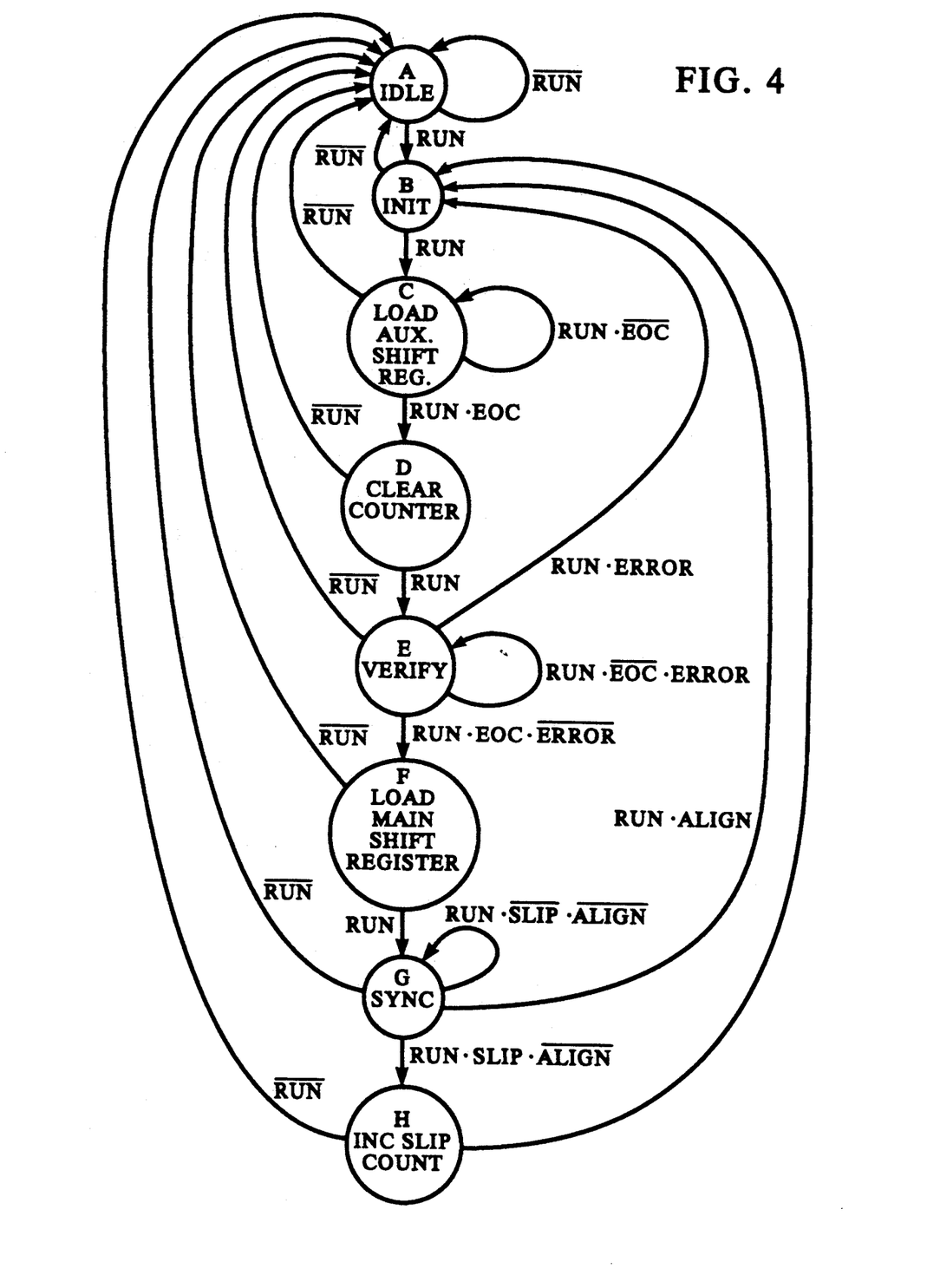
FIG. 4 is a state-transition diagram representing the operation of the controller employed in the bit-error-rate detector of FIGS. 3A and 3B.
Figure 5:
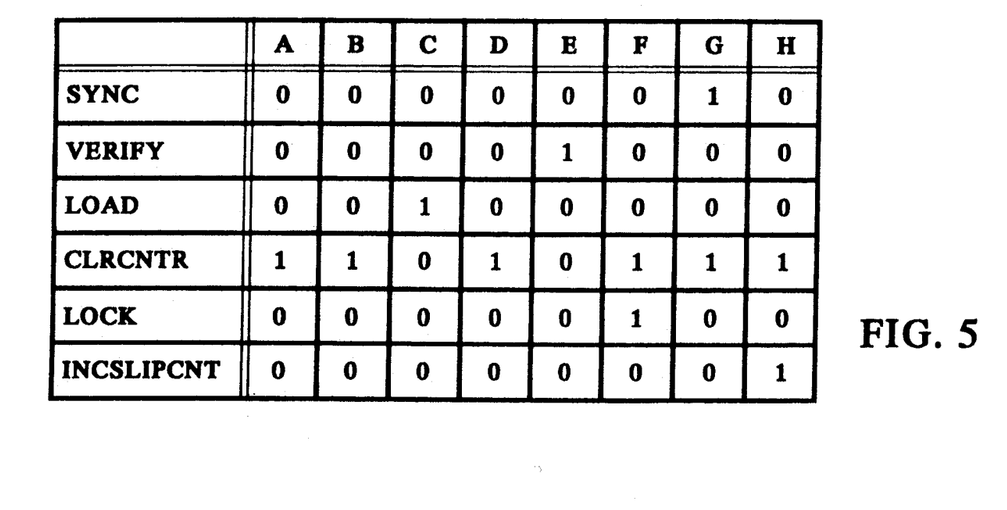
FIG. 5 is a table listing the controller outputs as a function of controller state.

FIGS. 4 and 5 depict controller 56 in a state-machine format. A description of its operation begins with the assumption that it is in the operating state G that normally prevails when the test set is monitoring the incoming signal for bit errors and the local PNG 46 is in synchronism with the CENTER signal. FIG. 4, which is a state-progression diagram, shows that the controller 56 remains in this normal, synchronized state G so long as the slip-indicating signal SLIP does not indicate that a slip has occurred and the higher-level controller keeps RUN asserted without asserting ALIGN. The higher-level controller keeps RUN asserted to keep the bit-error-rate detector operating; as all of the lines on the left side of FIG. 4 show, deasserting the RUN signal returns the controller from any other state to an idle state A. If the higher-level controller independently has information indicating that the transmitter and receiver are out of alignment, it may keep RUN asserted but also assert ALIGN to return the state machine to state B and thereby cause it to resynchronize in a manner that will be explained below.

FIG. 5, which is a table of the controller output values as a function of state, shows that the controller 56 asserts only SYNC and CLRCNTR while it is in the synchronized state G; its VERIFY, LOAD, LOCK, and INCSLIPCNT outputs are all deasserted. All of the slip detectors 60, 62, 64, and 66 respond to these signals and other inputs in a manner that will be described in connection with FIG. 6.

Figure 6:
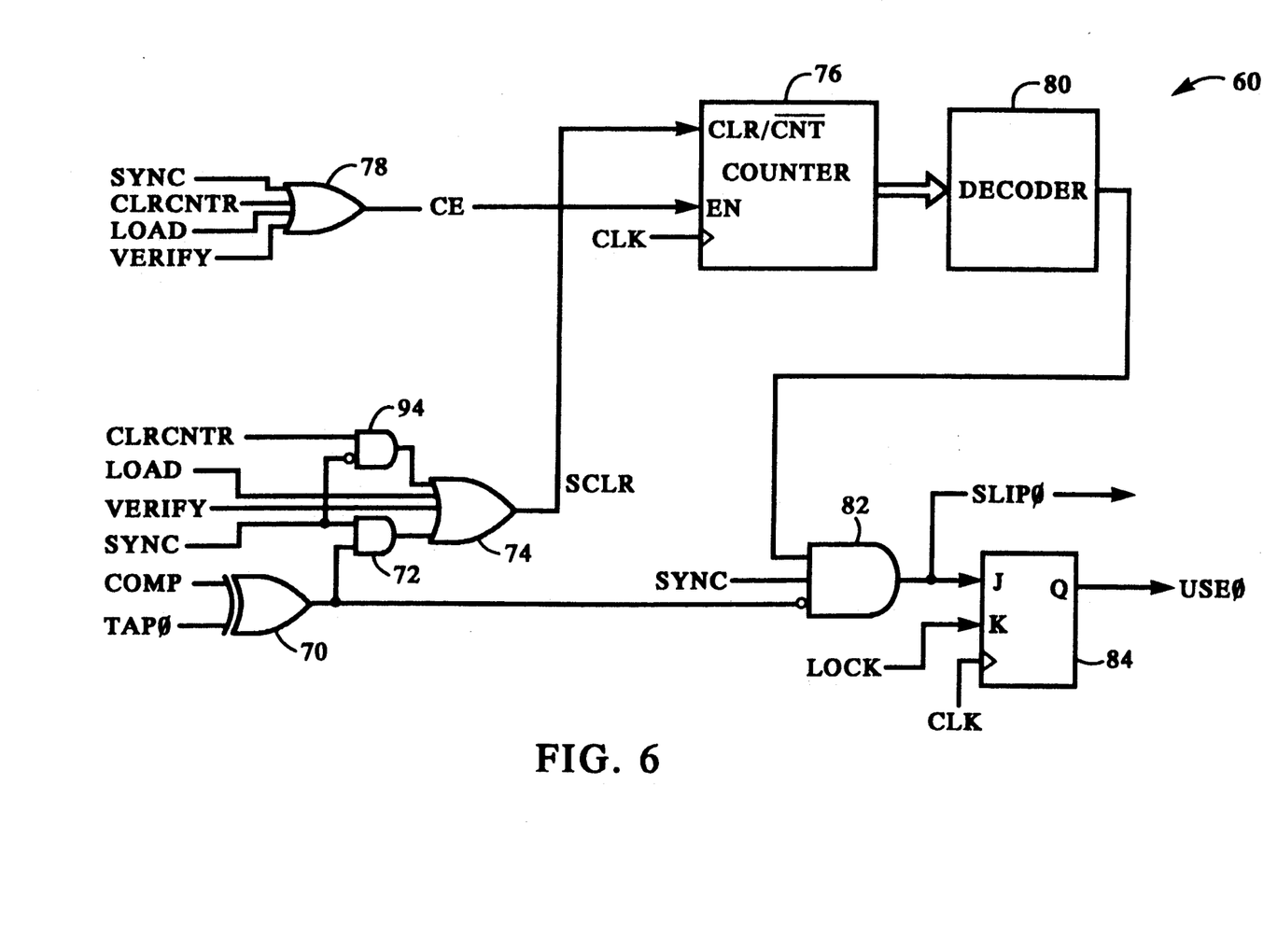
FIG. 6 is a logic diagram of one of the slip detectors shown in FIG. 3A.

FIG. 6 depicts slip detector 60, to which slip detectors 62, 64, and 66 are identical except that they receive TAP1, TAP2, and TAP3, respectively, instead of TAP0 and that they accordingly produce different outputs. An XOR gate 70 in FIG. 6 compares the input signal TAP0 with COMP, which is normally the output of the main local PNG 46. Since the controller is in the synchronization state and is accordingly asserting SYNC and CLRCNTR but deasserting LOAD and VERIFY, an AND gate 72 and an OR gate 74 forward the result of this comparison as SCLR to the clear-/count input terminal of a symbol-match counter 76. On each CLK (common clock) pulse to which the asserted output of an OR gate 78 enables counter 76 to respond, the output of counter 76 increments when the deasserted SCLR signal indicates a match. When SCLR is asserted and thereby indicates a mismatch, on the other hand, a CLK pulse causes the counter to reset to zero.

Counter 76 thus keeps track of the number of consecutive matches between TAP0 and COMP. A sequence of a symbol matches equal to the number of stages of the main PNG shift register 46 is taken as an indication that a slip has occurred. Rather than wait until the counter output represents that long a sequence, however, a decoder 80 asserts its output when the match-sequence length is one less than the slip-indicating length. This output, together with the asserted SYNC signal, conditions an AND gate 82 to respond immediately to the XOR gate 70's detection of one further match by generating a slip-indicating signal SLIP0 without waiting for the next CLK pulse, which causes assertion of the output USE0 of a flip-flop 84. The function of USE0 will be explained presently.

OR GATE 69 in FIG. 3A receives the SLIP0 signal and corresponding signals from the other slip detectors 62, 64, and 66 and applies an asserted SLIP signal to the controller 56 whenever any of those SLIPn signals is asserted. As FIG. 4 shows, the controller 56 responds to the asserted SLIP signal by leaving the synchronized state G and assuming the increment-slip-count state H for one clock period.

Figure 3B:
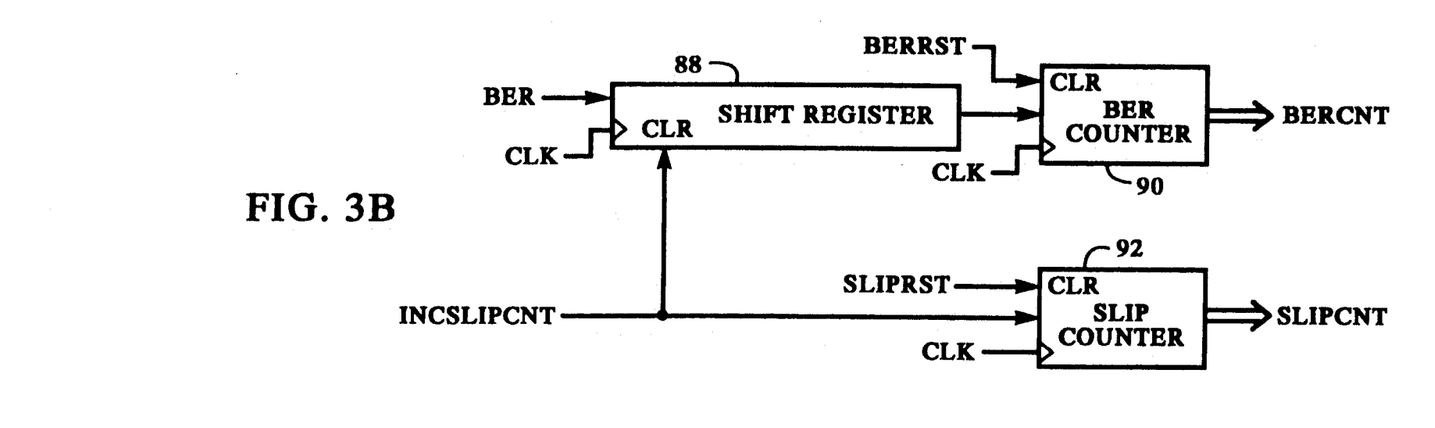

The purpose of the increment-slip-counter state H is to perform two functions related to error logging. As FIG. 3B shows, an error-delay pipeline comprising a shift register 88 receives from XOR gate 52 (FIG. 3A) the BER signal, whose assertion indicates a mismatch between the local-PNG output and the CENTER version of the input, and it normally forwards this signal after a delay equal to that of the PNG shift register to a bit-error-rate counter 90, which logs errors and generates an output BERCNT indicative of the number of bit errors it has counted since the last time the higher-level controller reset it by asserting BERRST.

When the controller 56 enters its increment-slip-count state H, the local-PNG output has been in agreement with one of the auxiliary versions of the input throughout the delay that the shift register 88 has imposed. Mismatch-indicating contents of register 88 in such a situation therefore do not result from an ordinary bit error but are instead slippage artifacts. FIG. 5 shows that the controller 56 asserts the INSLIPCNT signal when it assumes state H, and the assertion of INCSLIPCNT clears the register 88 to avoid logging such artifacts as ordinary bit errors. INCSLIPCNT also causes a slip counter 92 to increment and thereby log the occurrence of a slip.

The controller 56 also asserts CLRCNTR in state H This signal acts through an AND gate 94 and OR gates 74 and 78 of FIG. 6 to clear the match-sequence-length-indicating counter 76 in slip circuit 60 as well as corresponding counters in the other slip circuits 62, 64, and 66. To prevent further assertions of SLIP, the controller 56 also drops SYNC when it assumes state H.

The detection of a slip indicates that the main local PNG 46 is synchronized with the TAPn signal received by the slip detector 60, 62, 64, or 66 that detected the slip. In order to keep monitoring the input for errors other than those associated with a slip, therefore, comparison should be made with this version of the channel output rather than with the CENTER version, with which the comparison normally is made. When a SLIPn signal is asserted just before the end of the synchronized state G, therefore, the next clock signal causes a slip-sequence flip-flop 98 to be set and thus begin to assert its output at the beginning of the increment-slip-count state H. It applies this output to an AND gate 99. Gate 99's other input, LOCK, is ordinarily deasserted, so gate 99 ordinarily forwards the flip-flop-98 output as the gate-99 output SLIPSEQ. SLIPSEQ is the select signal for the multiplexer 48 that ordinarily forwards the CENTER signal to the XOR gate 52 for comparison with the local-PNG output. Assertion of SLIPSEQ causes multiplexer 48 to forward instead the output SIDE of an OR gate 100. Gate 100 forwards as SIDE the TAPn signal corresponding to the slip detector that detected the slip.

Specifically, OR gate 100 receives the outputs of four AND gates 102, 104, 106, and 108, which receive corresponding USEn signals from the slip detectors 60, 62, 64, and 66. When one of these detectors detects a slip, it conditions its corresponding AND gate 102, 104, 106, or 108 to forward the corresponding TAPn signal to OR gate 100, which accordingly forwards any asserted TAPn signal as SIDE through multiplexer 48 to XOR gate 52. XOR gate 52 therefore begins comparing the local-PNG output with the delayed input version that one of the slip detectors 60, 62, 64, and 66 has recognized as being in synchronism with the local PNG 46.

After one clock period in state H, which switches the error-detecting comparison from the main channel-output version CENTER to an auxiliary version TAPn, the controller starts the process of resynchronizing with CENTER. It begins by proceeding to the initialization state B. (The initialization state B is superfluous in the simple illustrated embodiment. By adding a condition for leaving state B, however, one can use it as a hold state to add features not essential to the invention.) FIG. 5 shows that the controller 56 drops CLRCNTR and asserts LOAD, which is the select signal for a multiplexer 112 interposed in the feedback path of an auxiliary local PNG 114 that operates in parallel with the main local PNG 46. With LOAD asserted, multiplexer 112 forwards the CENTER signal to the serial input port o the auxiliary-PNG shift register in place of the normal PNG feedback that it forwards when LOAD is deasserted.

FIG. 4 shows that the controller stays in the load state C until the assertion of an EOC (End Of Count) signal. EOC is the output that a decoder 115 generates when a controller counter 116 reaches a count equal to the length of the PNG shift register. By dropping CLRCNTR at the beginning of the load state, the controller allows the controller counter 116 to increment on every load-state clock signal and thereby act as a timer for that state. EOC is asserted when state C has lasted long enough for the entire shift register to be filled from the CENTER signal, so the auxiliary PNG 114 should be in synchronism with the CENTER signal at the end of the load state C.

But this needs to be verified, and the circuit of FIGS. 3A and 3B includes provisions for doing so by observing whether the auxiliary local PNG 114 accurately predicts a sequence of CENTER symbols equal in length to the PNG shift register. Specifically, when the controller 56 has remained in the load state C long enough to load its entire shift register from the CENTER signal—i.e., when it receives the EOC signal—it advances from state C to the clear-counter state D, in which it asserts CLRCNTR and thereby resets the controller counter 116. After one clock period in state D, it proceeds to the verify state E, in which it again deasserts CLRCNTR to let the controller counter time the duration of the controller state.

The purpose of the verify state E is to verify that synchronization has in fact occurred. XOR gate 68 compares the CENTER signal with the auxiliary-PNG output and asserts ERROR whenever they differ. If XOR gate 68 asserts ERROR during the verify state E, the controller 56 returns to the initialization state B so as to restart the synchronization procedure; although the ERROR assertion may have resulted from an actual bit error rather than a failure of synchronization, the controller assumes that faulty synchronization is the cause and repeats the synchronization procedure to insure proper synchronization.

If the XOR gate 68 does not assert ERROR before the EOC signal indicates that the verify state E has lasted for as many clock periods as there are stages in the PNG shift register, the controller 56 concludes that the auxiliary PNG 114 has achieved synchronism, and it proceeds to the load-main-PNG state F. In this state the controller 56 asserts LOCK, which causes the main PNG 46 to load its stages in parallel from the corresponding stages of the auxiliary PNG 114 and thereby synchronize itself with CENTER.

During this one-clock-period loading operation, the main-PNG output is not necessarily valid. Multiplexer 50 responds to the asserted LOCK signal by forwarding the output of the auxiliary PNG 114 rather than that of the main PNG 46 for comparison with the selected version of the input signal. Assertion of the LOCK signal also disables the SLIPSEQ gate 99 and causes the slip-sequence flip-flop 98 to reset at the next clock pulse. The resultant dropping of SLIPSEQ causes multiplexer 48 to forward its CENTER input rather than its SIDE input to the error-detecting XOR GATE 52 for comparison with the now-synchronized PNG output. Assertion of the LOCK signal also causes the USEn flip-flop corresponding to the USE0 flip-flop 84 in FIG. 6 to reset so that none of the TAPn signals is selected as SIDE. Also, as FIG. 5 indicates, the controller 56 asserts CLRCNTR signal in state F so that all of the slip-detector counters such as counter 76 of FIG. 6 are reset when, on the next clock pulse, the controller 56 returns to the synchronized state G, with which discussion of its operation began, and the bit-error rate detector resumes normal monitoring of the input signal.

As the foregoing embodiment illustrates, the present invention is a novel way of precisely distinguishing slip-caused errors in a frame-based channel from errors that result from other causes. The present invention thus constitutes a significant advance in the art.

I claim:

1. For distinguishing slip-based errors from other errors in a frame-based digital communications channel for communicating symbols in frames thereof lasting for predetermined frame times, a method comprising the steps of:
   A) generating a test sequence of discrete symbols and applying it to one end of the channel for transmission thereover;
   B) receiving the resultant channel output sequence at the other end of the channel;
   C) performing a main comparison, in which, with a main timing offset, the channel output sequence is compared with an expected sequence having the same order as the test sequence to detect symbol errors by detecting symbol mismatches therebetween;
   D) generating an indication of the number of symbol errors thus detected;
   E) performing at least one auxiliary comparison, in which, with a corresponding auxiliary offset, the channel output sequence is compared with an expected sequence having the same order as the test sequence to detect a frame slip by detecting a series of symbol matches of a predetermined length, each auxiliary offset differing from the main offset by an integral number of frame times; and
   F) generating a slip indication in response to detection of a series of symbol matches of a predetermined length.

2. A method as defined in claim 1 further comprising the step of responding to detection of a frame slip by adjusting the main offset to a value that synchronizes the expected sequence with the channel output sequence in the main comparison.

3. A method as defined in claim 2 further comprising the step of responding to detection of a frame slip by substituting one said auxiliary timing offset for the main timing offset in detecting the symbol errors until the main offset has been adjusted to synchronize the expected and channel output sequences.

4. A method as defined in claim 1 wherein the step of generating an indication of the number of symbol errors comprises generating an indication of a number determined by counting as symbol errors only those mismatches detected in the main comparison that do not occur during a match sequence in an auxiliary comparison by which a slip is detected.

5. A method as defined in claim 1 wherein the steps of performing the main and auxiliary timing offsets comprise comparing a common expected sequence with differently delayed versions of the channel output sequence.

6. A method as defined in claim 5 wherein:
   A) the step of generating a test sequence comprises operating a transmission pseudo-random generator that generates a cyclical test sequence;
   B) the step of performing a main comparison comprises operating a separate receiver pseudo-random-number generator that generates the expected sequence with an adjustable timing offset from the transmission pseudo-random number generator and comparing the output of the receiver pseudo-random-number generator with the channel output; and
   C) the step of performing the auxiliary comparison comprises comparing the output of the receiver pseudo-random-number generator with a version of the channel output sequence time offset by an integral number of frame times from the version thereof with which the output of the receiver pseudo-random-number generator is compared in the main comparison.

* * * * *